United States Patent [19]

Inman et al.

[11] 3,864,371

[45] Feb. 4, 1975

[54] BISAZOMETHINE PIGMENT AND PROCESS FOR ITS MANUFACTURE

[75] Inventors: Eric Richard Inman, Bridge of Weir; James McGeachie McCrae, Stewarton; Christopher Midcalf, Kilbarchan; Alison Turner, Houston by Johnstone, all of Scotland

[73] Assignee: Ciba-Geigy Corporation, Ardsley, N.Y.

[22] Filed: Feb. 20, 1973

[21] Appl. No.: 333,598

[30] Foreign Application Priority Data
Feb. 24, 1972 Great Britain...................... 8517/72

[52] U.S. Cl............ 260/439 R, 106/288 Q, 260/37, 260/41, 260/429 C, 260/566
[51] Int. Cl. ............................................. C07f 15/04
[58] Field of Search .................... 260/439 R, 429 C

[56] References Cited
UNITED STATES PATENTS

| | | | |
|---|---|---|---|
| 2,993,065 | 7/1961 | Kumins et al................... | 260/439 R |
| 3,440,254 | 4/1969 | Lenoir et al. .................... | 260/439 R |
| 3,441,578 | 4/1969 | Dimroth.......................... | 260/439 R |
| 3,687,991 | 8/1972 | Gaeng............................. | 260/429 C |

*Primary Examiner*—Arthur P. Demers

[57] ABSTRACT

A compound having the formula:

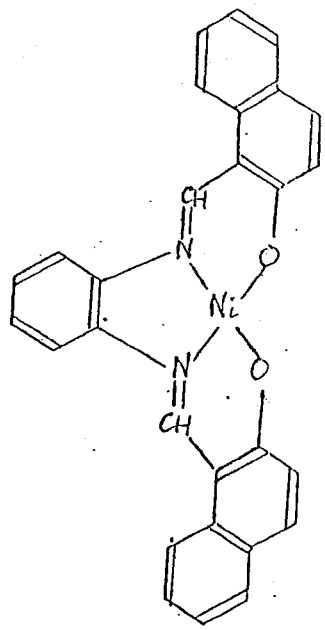

in the pigmentary form in which it has an orange-red colour and has an X chromaticity co-ordinate of from 0.59 to 0.63 and a Y chromaticity of from 0.33 to 0.36, each as hereinbefore defined.

8 Claims, No Drawings

BISAZOMETHINE PIGMENT AND PROCESS FOR ITS MANUFACTURE

The present invention is concerned with a new pigmentary form of the nickel complex of the bisazomethine from o-phenylene diamine and 2-hydroxynaphth-1-aldehyde.

This nickel complex which has the formula I

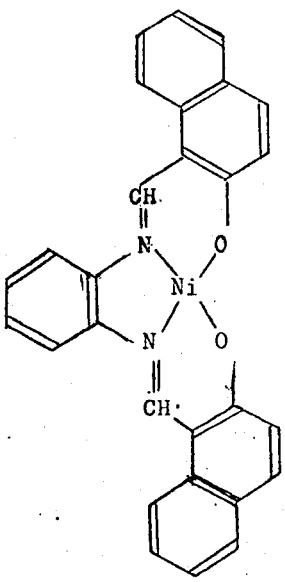

is a chemical compound known per se. It was first prepared by Mukherjee & Ray (page 606 of the Journal of the Indian Chemical Society 1955, Vol. 32), by a conventional metallisation of the ligand itself first prepared by Pfeiffer et al and described in the Journal Praktische Chemie 1937, Vol. 149 at page 247.

Its direct preparation from β-naphthol and o-phenylenediamine and its use as a golden brown pigment were described in U.S. Pat. No. 2,993,065 in 1961. The product, prepared as described in this patent is impure and even after purification by the recommended solvent extraction retains its characteristic golden brown shade which has not found favour in commerce.

We have now discovered that this compound exists in an attractive orange-red form which retains the fastness to light and weathering of the golden brown pigment and, in addition, possesses increased colouring power. Such a pigment is particularly valuable; as lightfast coatings of this shade, for example, for automotive lacquers, have hitherto had to be formulated by using either expensive dibromoanthanthrone pigments or lead pigments now considered undesirable on health grounds.

The exact physical nature of this pigmentary form is not known. Surprisingly, it does not differ significantly in analysis or in its X-ray diffraction pattern from the known form, but it can be clearly differentiated and defined by reference to the system of the Commission Internationale D'Eclarage (C.I.E.) as set out in 1931 using for convenience a 3 percent unreduced pigmentation in an alkyl melamine stoving lacquer illuminated by north facing daylight or its equivalent (Illuminance C of the C.I.E.). For this measurement, the pigment is incorporated into the lacquer by ball milling and applied to white card using either an applicator or by spraying in a conventional manner. The chromaticity coordinates are measured using a recording spectrophotometer fitted with a tristimulus integrator.

The product of this invention is characterised by having an orange-red colour possessing, under the conditions defined by the C.I.E. system and set out above, and $x$ chromaticity coordinate of from 0.59 to 0.63 and a $y$ chromaticity coordinate of from 0.33 to 0.36. It is distinguished from the known golden brown form whose chromaticity coordinates are $x=0.55-0.58$ and $y=0.365-0.39$.

Two methods of preparation are particularly advantageous for the direct preparation of this new orange red pigmentary form of the metal complex of Formula I.

In the first method, the 1:1 nickel complex of 2-hydroxy-1-naphthaldehyde is initially prepared as a very finely divided suspension in water by reacting 2-hydroxynaphth-1-aldehyde and a water soluble nickel salt at pH 7–9 preferably in the presence of a small amount, for example, 0.1 percent, of a nonionic surfactant using very efficient agitation. The complex is then further reacted with the appropriate amount of o-phenylene diamine under the same conditions except that the temperature is gradually raised to 90°–100°C. and held there until reaction is complete.

In the second method, the azomethine of formula II which

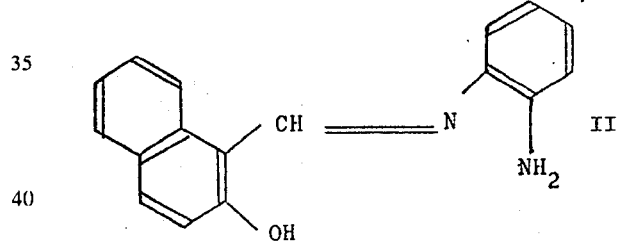

may be reacted under the same conditions, first with a water soluble nickel salt and afterwards with a further molecule of 2-hydroxynaphth-1-aldehyde.

In both methods the pH is controlled by the use of a buffer salt for which purpose sodium acetate is particularly suited.

The compound of formula I may be employed as a pigment directly after its production according to a process of this invention, that is after it has been filtered off from its reaction mixture and dried. Alternatively, it may be further processed using a wet or dry conditioning technique such as grinding, either alone or in the presence of a water-soluble salt or other medium which can subsequently be removed, for instance by washing.

Because of its economical and easy mode of production, combined with its excellent pigmentary properties, the compound of the invention is valuable for use as a pigment in a wide variety of organic media, for instance natural and synthetic polymeric materials such as rubber, polyolefines, polystyrene, polyurethanes and resinous materials. Of particular interest are surface coating media, such as paints, inks and lacquers.

Accordingly, the present invention also provides a composition comprising an organic material containing, as pigment, a compound of the invention as hereinbefore defined.

Some Examples will now be given. Parts and percentages shown are by weight unless otherwise stated.

EXAMPLE 1

17.2 Parts of 2-hydroxy-1-naphtahldehyde were suspended in a solution consisting of 300 parts water, 16.0 parts sodium acetate trihydrate and 0.1 part of a condensate of nonlphenol and ehtylene oxide which is a non-ionic surfactant sold under the trade mark Lissapol NX, and the suspension was stirred at room temperature with high speed shear agitation for 15 minutes. To the cream coloured suspension resulting, there was added a solution of 16.0 parts of nickel nitrate hexahydrate dissolved in 50 parts of water, and the resultant lime green suspension was stirred as before, for 30 minutes. After the addition of 5.4 parts of o-phenylene diamine, the mixture was stirred for 45 minutes to give a buff-coloured suspension which, on heating to 95°C. over the course of 5 minutes, became red brown in colour whilst the pH changed from 7-8 to 4. A solution of 16.0 sodium acetate trihydrate in 50 parts of water was then added and the temperature was maintained at 97°-99°C. for 1 hour whereupon a deep red suspension was obtained. This suspension was filtered hot, the filter-cake washed with 1,500 parts of hot water and then dried, giving 23.0 parts (97.5 percent of theory) of an orange red powder which did not melt below 360°C. Ni = 13.8 percent (theory 12.4 percent). Chromaticity co-ordinates: $X = 0.62, y = 0.34$.

EXAMPLE 2

13.1 Parts of an aqueous paste of 2-amino-N'-(2-hydroxy-naphthylidene) aniline (II) (100 percent actual pigment) were suspended in 1,000 parts water containing 0.1 part of Lissapol NX and dispersed using high speed shear agitation for 5 minutes. A solution of 7.7 parts of sodium acetate trihydrate in 50 parts water was added and the whole stirred for 5 minutes; next a solution of 14.54 parts nickel nitrate hexahydrate in 100 parts water was added and the mixture stirred for 5 minutes, and finally a solution of 7.7 parts sodium acetate trihydrate in 50 parts water was added and the mixture stirred for a further 10 minutes.

8.6 Parts of 2-hydroxy-1-naphthaldehyde were added over 1½ minutes and the resultant suspension stirred at room temperature for 7 minutes before being heated to 99°C. over the course of 13 minutes to give a red-brown suspension of pH 5. The pH was adjusted to 7 by adding a solution of 7.7 parts sodium acetate trihydrate in 50 parts water and the suspension held at 97°-99°C. for 1 hour, after which time no reaction of the liquors with dimethylglyoxime was obtained. A deep orange red solid was filtered off, the filter-cake washed with 2,000 parts hot water and dried, giving 22.3 parts (95 percent of theory) of orange red powder which did not melt below 360°C. Chromaticity co-ordinates: $x = 0.62, y = 0.34$

EXAMPLE 3

60 Parts of the product of Example 1 were ball milled with 138 parts of a solution of an unmodified butylated melamine/formaldehyde resin in n-butanol sold under the trade mark "Epok U9193" and 452 parts of xylene. 350 parts of a solution of a hydroxy acrylic resin in a 1:1 mixture of xylene and n-butanol sold under the trade mark "Epok D2103" were then added gradually and ball milling continued. The resulting paint had a pigment to binder ration of 1:5. This was adjusted to 1:10 by the addition of more resin solution and the paint was thinned to the required viscosity for spraying. Aluminum panels were sprayed with this lacquer and then stoved at 120°C. for 30 minutes. The resulting orange red paint films had excellent fastness to light, heat and acids, and were only slightly altered on exposure to a Xenon arc weathering lamp for 1,000 hours.

What we claim is:

1. A compound having the formula:

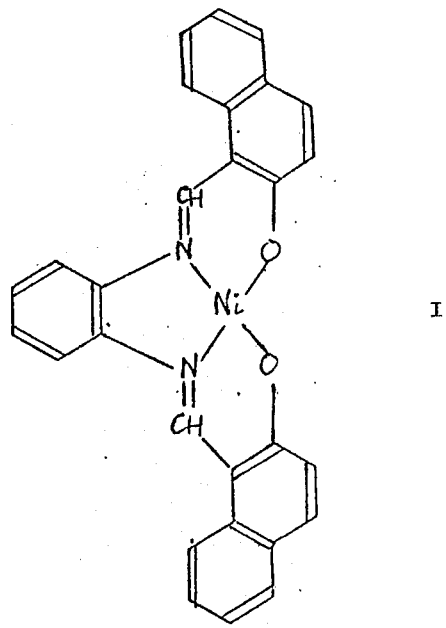

I in the pigmentary form in which it has an orange-red colour and has an X chromaticity co-ordinate of from 0.59 to 0.63 and a Y chromaticity of from 0.33 to 0.36.

2. A process for the production of a compound of formula I as defined in claim 1 comprising
   a. reacting 2-hydroxynaphth-1-aldehyde with a water soluble nickel salt at a pH value in the range of from 7 to 9 with efficient agitation, to produce a finely divided suspension of the 1:1 nickel complex of 2-hydroxy-1-naphthaldehyde in water, and
   b. reacting the complex so formed with the appropriate amount of o-phenylene diamine under the same conditions, except that the reaction temperature is gradually raised to 90° - 100°C., and held in this range until reaction is complete.

3. A process as claimed in claim 2, wherein 0.1 percent of a non-ionic surfactant is present in step (a).

4. A process as claimed in claim 3 wherein said non-ionic surfactant is a condensate of nonylphenol and ehtylene oxide, said nickel salt is nickel nitrate hexahydrate, and said pH is controlled by the use of sodium acetate trihydrate.

5. A process of producing a compound of formula I as defined in claim 1 comprising a. reacting a compound having the formula:

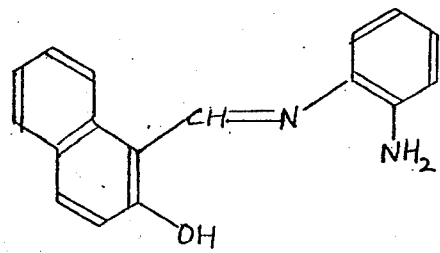

II with a water soluble nickel salt at a pH value of from 7 to 9 with efficient agitation, to produce a finely divided suspension of 1:1 nickel complex of 2-amino-N'-(2-hydroxynaphthylidene) aniline in water, and b. reacting the complex so formed with the appropriate amount of 2-hydroxy-1- naphthaldehyde under the same conditions, except that the reaction temperature is gradually raised to 90°–100°C. and held in this range until reaction is complete.

6. A process as claimed in claim 5, wherein 0.1 percent of a non-ionic surfactant is present in step (a).

7. A process as claimed in claim 5 wheerein the pH is controlled by the use of a buffer salt.

8. A process as claimed in claim 7 wherein the buffer salt is sodium acetate.

* * * * *